United States Patent
Woodall, III et al.

(10) Patent No.: US 9,222,680 B1
(45) Date of Patent: Dec. 29, 2015

(54) DUCT-FREE COOKING AIR FILTRATION SYSTEMS AND METHODS

(75) Inventors: William Miles Woodall, III, Dallas, TX (US); Robert Seloff, Carrollton, TX (US)

(73) Assignee: Vent-A-Hood, Ltd., Richardson, TX (US)

( * ) Notice: Subject to any disclaimer, the term of this patent is extended or adjusted under 35 U.S.C. 154(b) by 895 days.

(21) Appl. No.: 12/804,470

(22) Filed: Jul. 22, 2010

Related U.S. Application Data (60) Provisional application No. 61/281,657, filed on Nov. 20, 2009.

(51) Int. Cl.
F24C 15/20 (2006.01)

(52) U.S. Cl.
CPC ............. *F24C 15/20* (2013.01); *F24C 15/2035* (2013.01)

(58) Field of Classification Search
CPC .. F24C 15/20; F24C 15/2042; F24C 15/2035; B01D 45/14; Y10S 55/36
USPC ............... 454/49, 67, 354; 126/229 R, 299 D
See application file for complete search history.

(56) References Cited

U.S. PATENT DOCUMENTS

| | | |
|---|---|---|
| 2,077,496 A | 4/1937 | Sonntag |
| 2,182,106 A | 12/1939 | Ames |
| 2,226,641 A | 12/1940 | Sonntag |
| 2,369,375 A | 5/1943 | Sonntag |
| 2,341,245 A | 2/1944 | Sonntag |
| 2,349,668 A | 5/1944 | Marker et al. |
| 2,456,391 A | 12/1948 | Davies |
| 2,619,023 A | 3/1950 | Kisling |
| 2,633,071 A | 3/1953 | Erickson |
| 2,634,718 A | 4/1953 | Williams |
| 2,710,573 A | 6/1955 | Marker |
| 2,748,688 A * | 6/1956 | Smith ........................ 126/299 D |
| 2,793,712 A * | 5/1957 | Graswich ................ F24C 15/20 |
| | | 126/299 D |
| 2,857,836 A | 10/1958 | Bernstein |
| 2,862,437 A | 12/1958 | Smith et al. |
| 2,868,108 A | 1/1959 | Petersen |
| 2,886,124 A | 5/1959 | Scharmer |
| 2,889,007 A | 6/1959 | Lunde |
| 2,893,305 A | 7/1959 | Jenson et al. |
| 3,064,551 A | 11/1962 | Stalker |
| 3,125,869 A | 3/1964 | Winton |
| 3,207,058 A * | 9/1965 | Gaylord ................. A62C 3/006 |
| | | 126/299 E |

(Continued)

FOREIGN PATENT DOCUMENTS

| | | |
|---|---|---|
| FR | 2308973 | 11/1976 |
| JP | 4-106346 | 4/1992 |
| JP | 4-260740 | 9/1992 |

*Primary Examiner* — Alissa Tompkins
*Assistant Examiner* — Jonathan Cotov
(74) *Attorney, Agent, or Firm* — James J. Murphy; Thompson & Knight LLP (57) ABSTRACT

A duct-free air filtration system including a housing having a hood for capturing air, grease, and smoke, and an elongated exhaust section in fluid communication with the hood. A grease extracting blower unit takes in air, grease, and smoke through the hood and exhausts air and smoke through the exhaust section of the housing with a substantial amount of the grease removed by centrifugal force. A charcoal filter disposed in the exhaust section removes odors from the air exhausted from the grease extracting blower unit and a smoke filter removes smoke from the air passed through the charcoal filter.

9 Claims, 6 Drawing Sheets (56) References Cited

U.S. PATENT DOCUMENTS

| | | | |
|---|---|---|---|
| 3,251,290 A | 5/1966 | Jenson et al. | |
| 3,364,664 A * | 1/1968 | Doane | F24C 15/20 |
| | | | 126/299 D |
| 3,376,804 A * | 4/1968 | Marks | F24C 15/20 |
| | | | 126/299 D |
| 3,393,497 A | 7/1968 | Donnelly | |
| 3,490,206 A * | 1/1970 | Doane | F24C 15/20 |
| | | | 126/299 E |
| 3,496,704 A | 2/1970 | Bandlow | |
| 3,566,585 A * | 3/1971 | Deaver et al. | F24C 15/2035 |
| | | | 126/299 D |
| 3,589,266 A | 6/1971 | Hike et al. | |
| 3,625,135 A | 12/1971 | Carlson et al. | |
| 3,653,179 A * | 4/1972 | Doane | F24C 15/20 |
| | | | 55/DIG. 36 |
| 3,690,245 A | 9/1972 | Ferlise et al. | |
| 3,785,124 A * | 1/1974 | Gaylord | F24C 15/2057 |
| | | | 126/299 D |
| 3,834,295 A | 9/1974 | Seidel | |
| 3,865,022 A | 2/1975 | Ahlrich | |
| 3,983,796 A | 10/1976 | Ahlrich | |
| 4,038,912 A * | 8/1977 | Kuechler | 126/299 D |
| 4,088,123 A | 5/1978 | Bowen, Jr. et al. | |
| 4,089,328 A | 5/1978 | Bergmark et al. | |
| 4,105,015 A | 8/1978 | Isom | |
| 4,120,290 A | 10/1978 | Bowen, Jr. et al. | |
| 4,121,199 A | 10/1978 | Young | |
| 4,121,569 A | 10/1978 | Bowen, Jr. et al. | |
| 4,122,835 A | 10/1978 | Bowen, Jr. et al. | |
| 4,130,111 A | 12/1978 | Ristic | |
| 4,133,300 A | 1/1979 | Burton, Jr. et al. | |
| 4,146,016 A | 3/1979 | Bowen, Jr. et al. | |
| 4,166,448 A | 9/1979 | Miller et al. | |
| 4,235,220 A | 11/1980 | Hepner | |
| 4,250,870 A * | 2/1981 | Kuechler | 126/299 D |
| 4,266,528 A * | 5/1981 | Barnhart | F24C 15/20 |
| | | | 126/299 D |
| 4,327,274 A | 4/1982 | White et al. | |
| 4,350,504 A * | 9/1982 | Diachuk | 422/105 |
| 4,506,655 A * | 3/1985 | Kuechler | 126/299 D |
| 4,607,614 A * | 8/1986 | Higashino | F24C 15/20 |
| | | | 126/299 D |
| 4,741,257 A | 5/1988 | Wiggin et al. | |
| 4,903,685 A | 2/1990 | Melink | |
| 4,987,882 A * | 1/1991 | Kaufman | 126/299 D |
| 5,074,281 A | 12/1991 | Fluhrer et al. | |
| 5,154,743 A * | 10/1992 | Takato | F04D 17/164 |
| | | | 55/317 |
| 5,207,809 A * | 5/1993 | Higashino | F04D 29/30 |
| | | | 55/401 |
| 5,211,159 A | 5/1993 | Lieblein et al. | |
| 5,421,320 A | 6/1995 | Brown | |
| 5,472,342 A * | 12/1995 | Welsh et al. | 126/299 E |
| 5,578,100 A * | 11/1996 | Montaclair et al. | 55/341.1 |
| 5,642,784 A | 7/1997 | Guay et al. | |
| 5,656,170 A | 8/1997 | Henderson | |
| 5,690,093 A | 11/1997 | Schrank et al. | |
| 5,718,219 A * | 2/1998 | Boudreault | F24C 15/20 |
| | | | 126/299 E |
| 5,755,214 A | 5/1998 | Lai | |
| 5,814,115 A * | 9/1998 | Allen et al. | 55/350.1 |
| 5,843,197 A * | 12/1998 | Rossnagel | 55/385.2 |
| 6,010,558 A * | 1/2000 | Ackland | 95/141 |
| 6,142,142 A | 11/2000 | Woodall, III et al. | |
| 6,182,653 B1 * | 2/2001 | Otenbaker | F24C 15/20 |
| | | | 126/299 D |
| 6,220,238 B1 * | 4/2001 | Boudreault | F24C 15/20 |
| | | | 126/299 D |
| 6,455,818 B1 * | 9/2002 | Arntz | F24C 15/2042 |
| | | | 126/299 R |
| 6,648,937 B1 * | 11/2003 | Nguyen et al. | 55/421 |
| 6,752,146 B1 * | 6/2004 | Altshuler et al. | 128/201.25 |
| 6,820,609 B2 * | 11/2004 | Woodall, III | F24C 15/20 |
| | | | 126/299 D |
| 7,513,248 B2 * | 4/2009 | Ng | F24C 15/20 |
| | | | 126/299 R |
| 7,699,051 B2 * | 4/2010 | Gagas | F24C 15/2028 |
| | | | 126/299 D |
| 7,717,107 B2 * | 5/2010 | Ota | 126/299 D |
| 8,246,705 B2 * | 8/2012 | Bain et al. | 55/467 |
| 2005/0224069 A1 * | 10/2005 | Patil | F24C 15/2021 |
| | | | 126/299 D |
| 2006/0157048 A1 * | 7/2006 | Heilman | F24C 15/2035 |
| | | | 126/299 R |
| 2007/0135031 A1 * | 6/2007 | Vlamis | B08B 3/02 |
| | | | 454/67 |
| 2008/0202492 A1 * | 8/2008 | Ota | F24C 15/2042 |
| | | | 126/299 D |
| 2009/0264060 A1 * | 10/2009 | Livchak et al. | 454/61 |

* cited by examiner

DUCT-FREE COOKING AIR FILTRATION SYSTEMS AND METHODS

CROSS-REFERENCE TO RELATED APPLICATION

The present application claims the benefit of U.S. Provisional Patent Application Ser. No. 61/281,657, filed Nov. 20, 2009.

FIELD OF INVENTION

The present invention relates in general to air filtration techniques and in particular to ductless cooking air filtration systems and methods.

BACKGROUND OF INVENTION

Cooking creates undesirable by-products such as smoke and odor that can pollute an inhabited airspace if they are not removed or reclaimed. Consequently, many devices have been invented for addressing the problem of airborne cooking contaminants. For example, ducted range hoods remove the contaminated air from the inhabited area, while ductless range hoods intake air from the cooking area, remove at least some of the contaminants, and then re-circulate the resulting exhaust air back into the inhabited space.

Currently available re-circulating (ductless) residential cooking ventilation systems typically rely on an ineffective grease separator and even less effective optional thin odor "filter". Laboratory testing of these conventional re-circulating systems has indicated that, at best, only a portion of the cooking contaminants are removed from the exhaust air. These conventional systems are particularly ineffective in removing smoke and lingering odors. Furthermore, conventional grease separators and odor filters, when used, block the natural inflow into the range hood "collector" and eliminate necessary capture space.

Hence, given the significant disadvantages of currently available cooking ventilation systems, new cooking ventilation apparatus and methods are desirable for removing cooking by-products, including grease, odors, and smoke, from inhabited areas.

SUMMARY OF INVENTION

The principles of the present invention are embodied in a cooking air recovery system including a housing having a hood for capturing air, grease, and smoke, and an elongated exhaust section in fluid communication with the hood. A grease extracting blower unit takes in air, grease, and smoke through the hood and exhausts air and smoke through the exhaust section of the housing with a substantial amount of the grease removed by centrifugal force. A charcoal filter disposed in the exhaust section removes odors from the air exhausted from the grease extracting blower unit and a smoke filter removes smoke from the air passed through the charcoal filter.

Embodiments of the present principles realize substantial advantages over the prior art. Among other things, an unobstructed hood, without screens or filters at the hood aperture, allows for smoke, grease, and odor to be efficiently captured and passed to the centrifugal blower-separator. The centrifugal blower—grease extractor in turn liquefies and removes grease from the air flow and deposits it in a pan for easy disposal. Furthermore, by removing a substantial portion of the grease, the centrifugal blower—extractor ensures that the media in the following charcoal filter is not contaminated.

A thick, heavy charcoal filter advantageously ensures that the exhaust air flow remains in contact with the activated filter media for a sufficiently long period of time to remove odor. Finally, a high-density filter with a large contact area removes smoke from the exhaust air flow.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1-4 of the drawings, in which like numbers designate like parts.

Figure 1:
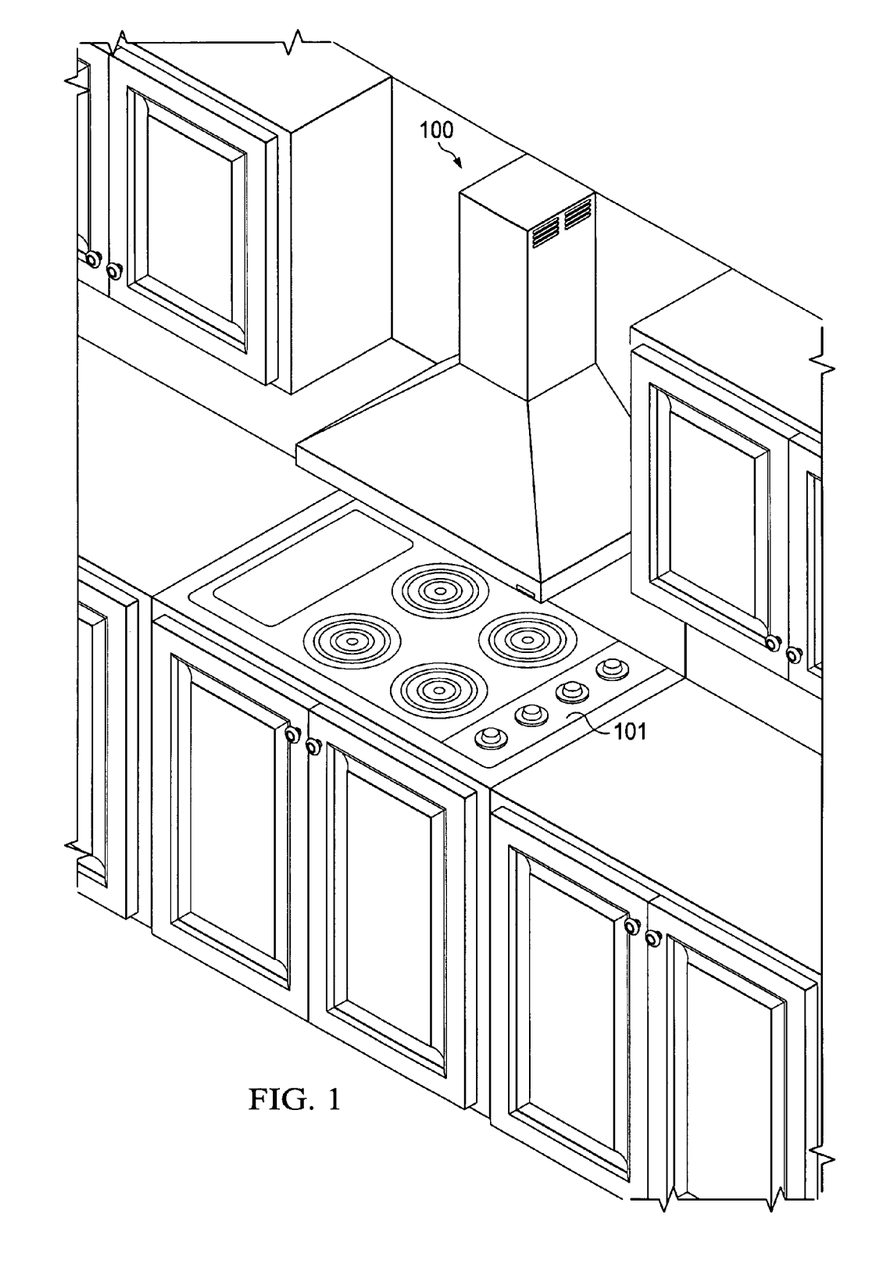
FIG. 1 is a diagram of a representative duct-free cooking air filtration system, embodying the principles of the present invention, shown in a typical home cooking environment.

FIG. 1 is a diagram of an exemplary duct-free hood system 100 embodying the principles of the present invention. Duct-free hood system 100 is shown disposed over a conventional home kitchen stove 101, which during normal cooking generates cooking byproducts including grease, odors, and smoke. While duct-free hood system 100 is shown the preferred home kitchen environment, the present inventive principles are not limited thereto, and may be applied to other environments, such as commercial kitchens. In addition to stoves, the cooking byproducts can be generated by other cooking appliances, such as frying pans and similar electric apparatus.

Figure 2A:
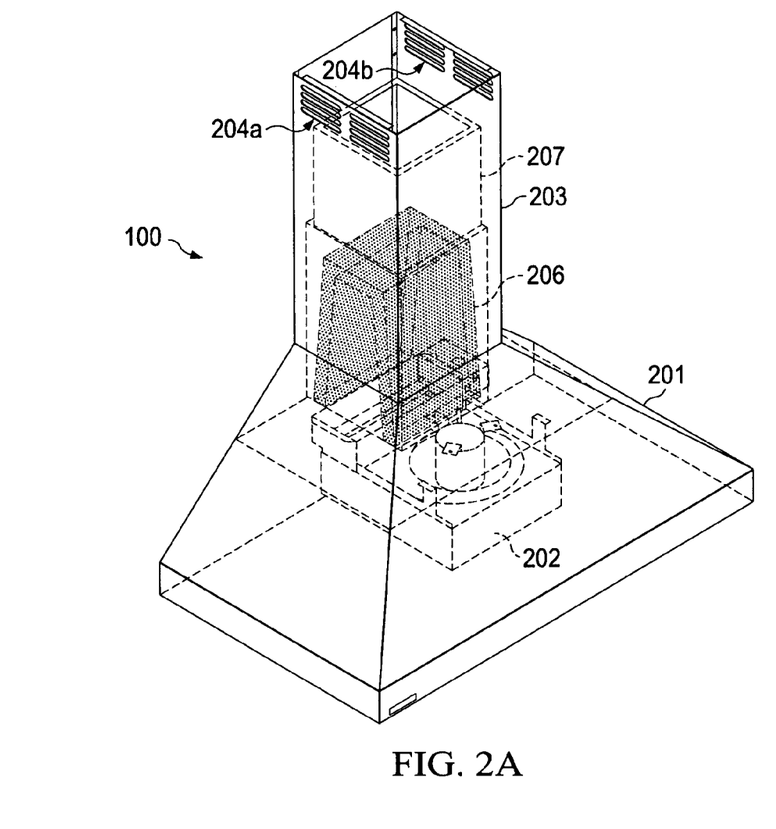
FIG. 2A is a diagram providing a prospective view of the duct-free air filtration system of FIG. 1.

FIG. 2A is line drawing showing the internal structures of duct-free hood system 100. In particular, duct-free hood system 100 includes a hood 201, which provides a wide-open aperture, without obstructing screens or filters, for receiving intake air flow containing cooking byproducts. Hood 201 and/or exhaust housing 203 are constructed from stainless steel, glass, or a similar material that is sufficiently rugged yet provides for an ornamental design. Intake air flow is inducted by a centrifugal blower-grease extractor 202, which in the illustrated embodiment is constructed and operates in accordance with co-assigned U.S. Pat. No. 6,820,609 to Woodall, I I I et al. for Low-profile Ventilation Hood.

The exhaust air discharged from centrifugal blower-grease extractor 202 is passed into exhaust housing 203 of duct-free hood system 100 towards exhaust vents 204a-204b. Exhaust housing 203 includes a thick odor removing activated charcoal filter 205 and a pleated fiber smoke filter 206. As shown in the exploded view of FIG. 2B, activated charcoal filter 205 and smoke filter 206 are preferably discrete units, which can be removed from exhaust housing 203 for servicing or replacement.

Figure 2B:
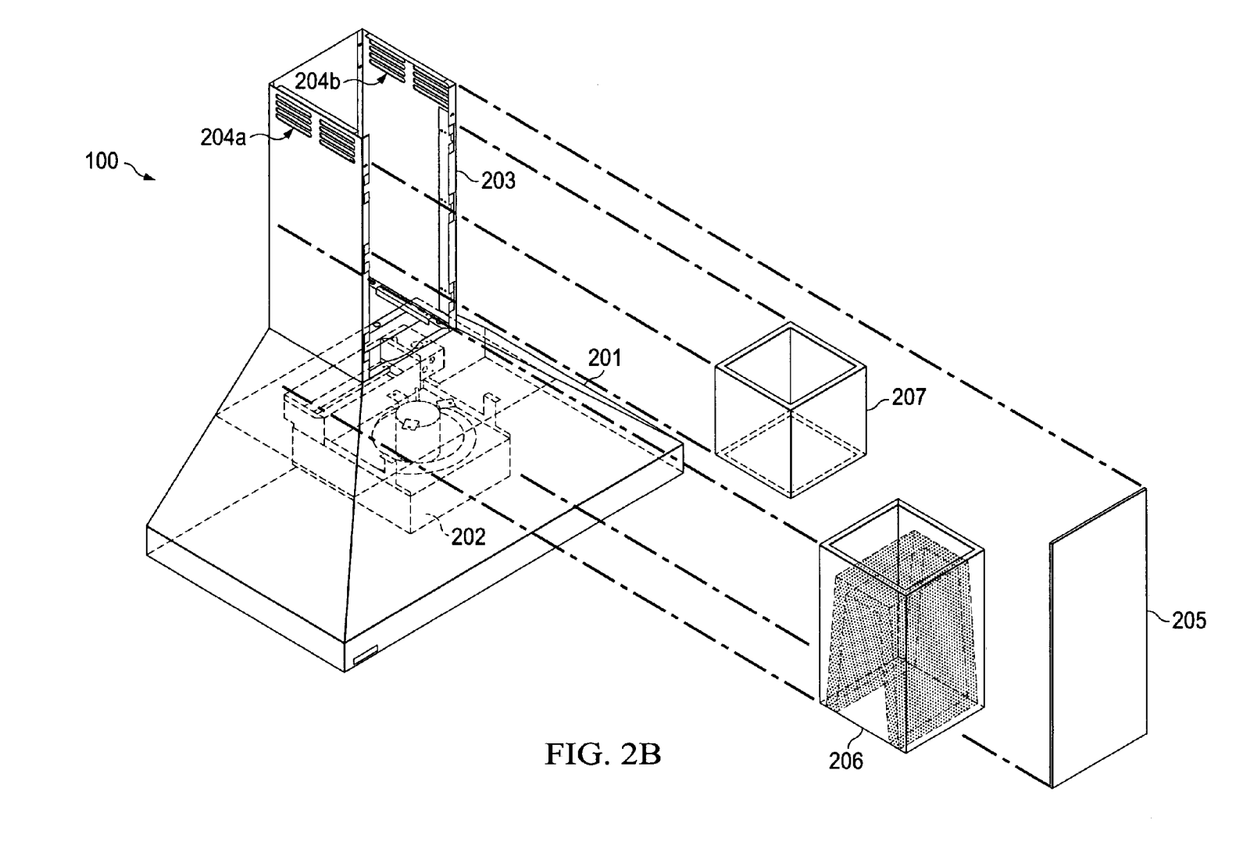
FIG. 2B is a diagram providing a partially exploded view of the duct-free air filtration system shown in FIG. 1.

In the illustrated embodiment, activated charcoal filter 205 is constructed of a double layered squared off inverted "U" shaped chamber made of perforated metal enclosed in a sheet metal box-shaped housing that is open top and bottom. Between the double layers of perforated metal is a one (1) inch thick bed of activated carbon pellets. (Other types of odor filtering media may be used in alternate embodiments.) The squared off inverted "U" shaped carbon bed advantageously maximizes the exposure time of the exhaust air stream to the carbon pellets within the space constraints.

Odor removal effectiveness increases with the time the contaminated air is in contact with the actuated charcoal and this design generates carbon pellet to exhaust air stream exposure approximately fifty (50) times longer than existing carbon thin mat filters. For example, for an embodiment of the present invention in which blower-grease extractor 202 provides an exhaust air flow of approximately 200 cubic feet per minute (cfm) and charcoal filter 205 provides approximately 221 cubic inches (cubic in.) of charcoal pellets, the exhaust air stream exposure ratio is approximately 220 cfm/231 cubic in or 0.85 cfm/cubic in. (The performance of charcoal filter 205 can be improved by reducing the cfm/cubic in. ratio or reduced by increasing the cfm/cubic in, as needed for the particular embodiment).

Smoke filter 206, in the illustrated embodiment, mounts directly on the open top of the box shaped charcoal filter housing of charcoal filter 206. This configuration forces all of the air flowing through the activated carbon bed into smoke filter 206. Preferably, smoke filter 206 includes a filter element constructed of thin layer glass media folded into a multi-pleated pattern to maximize filter surface area within the space constraints. In the illustrated embodiment, the filter media is rated to trap 95 percent of particles measuring three microns and larger that enter the filter. Other ratings from 60 percent of particles measuring three microns and larger to 99.97 percent of particles measuring three microns and larger can also be utilized. (The smoke particles are permanently trapped within the filter element because they are larger than the openings in the filter media.) For an exhaust air flow of approximately 200 cfm, and a filter media providing approximately 35 square feet of surface area, the exhaust air stream exposure ratio is 200 cfm/35 sq. ft. or 5.5 cfm/sq. ft. (The performance of smoke filter can be increased by reducing the cfm/sq. ft. ratio, or reduced by reducing the cfm/sq. ft. ratio, as required by the particular embodiment.

Figure 3A:
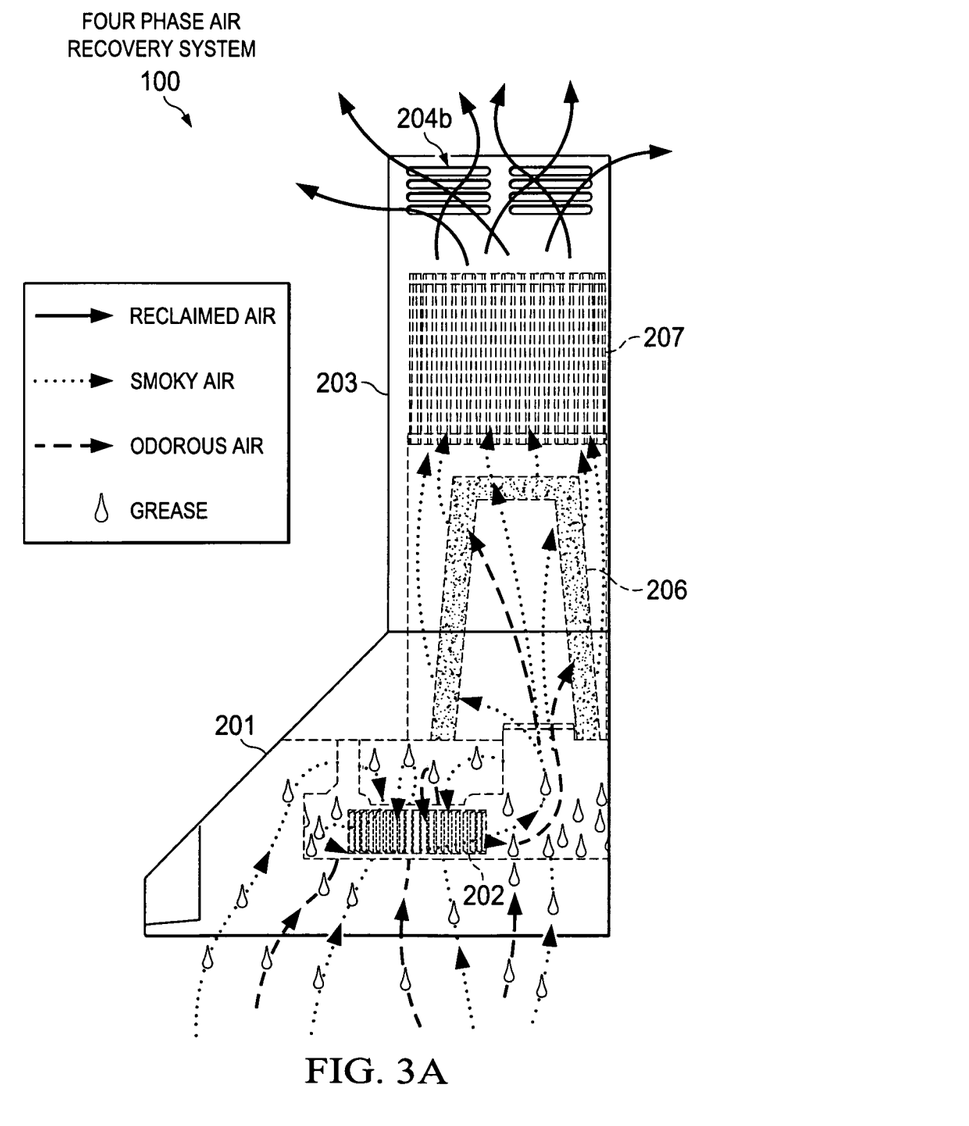
FIG. 3A is a diagram providing a cut-away view of the duct air filtration system of FIG. 1.
Figure 3B:
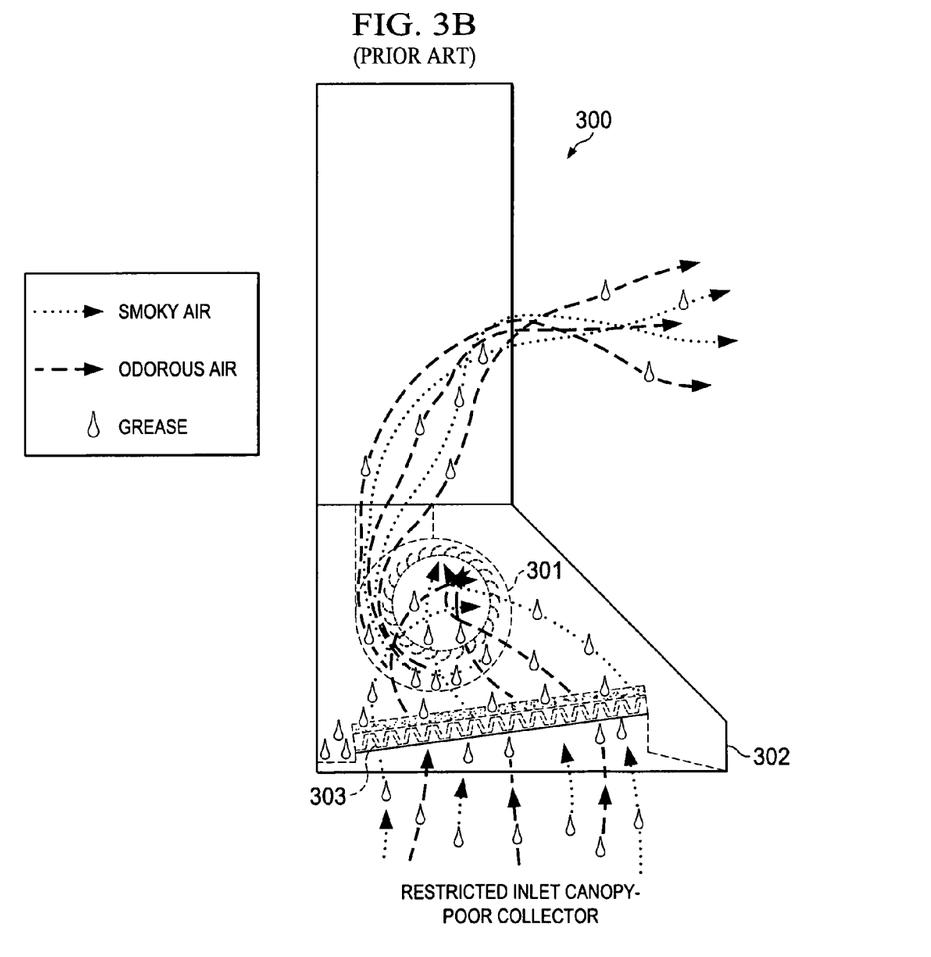
FIG. 3B is a conceptual diagram of a conventional ductless hood system.

The four-phase air recovery process implemented by duct-free hood system 100 is illustrated in FIG. 3A. The first and second phases are implemented by blower-grease extractor 202, which is shown in further detail in FIG. 4. In particular, blower-grease extractor includes a centrifugal blower 401, circular intake aperture 402, sidewalls 403, grease pan 404, and laterally offset exhaust aperture 405. A complete description of blower-grease extractor 202 is provided in co-assigned U.S. Pat. No. 6,820,609, incorporated herein by reference.

Figure 4:
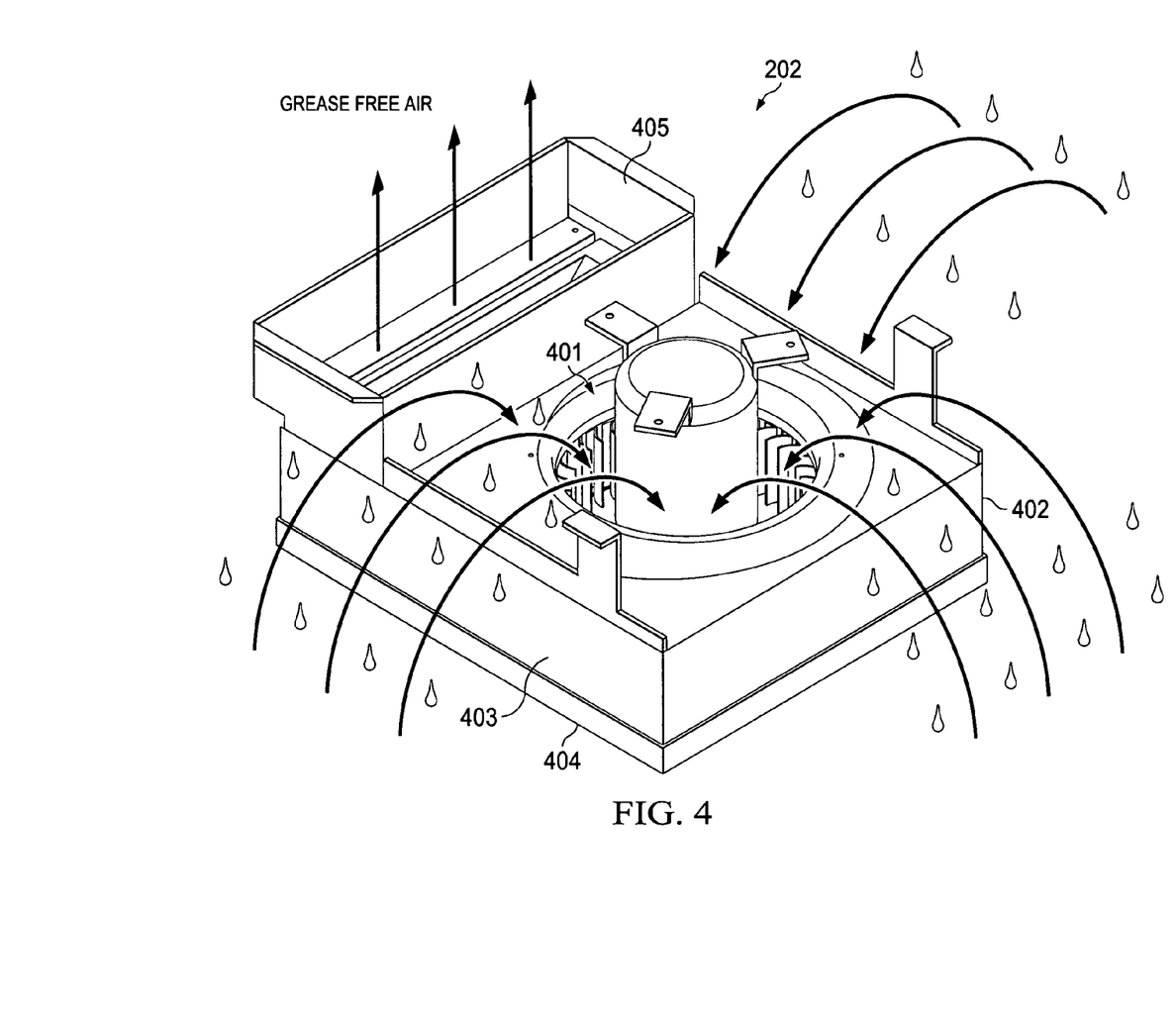
FIG. 4 is a diagram of the blower-grease extractor assembly of the duct-free air filtration system of FIG. 1.

In the first phase, a centrifugal blower 401 achieves active canopy collection by pulling air from hood (canopy) 201 in through intake aperture 402. The wide-open design of hood canopy 201 allows blower-grease extractor 202 to efficiently capture the rising cooking byproducts from the underlying cooking appliance.

For the second phase, a temperature sensor ensures that blower 401 is operating at the optimum speed for centrifugal grease extraction. Such a temperature sensor is disclosed in co-assigned U.S. Pat. No. 6,142,142, also incorporated herein by reference. As the dirty air passes through aperture 402, the grease is separated from the air as the air undergoes rapid radial acceleration. The grease is then gravity collected in grease collection pan 404 while the grease-free air passes through laterally offset exhaust aperture 405.

In the third phase, the air stream exhausted from blower-grease extractor 202 is passed through charcoal odor filter 205, discussed in detail above. Finally, in the fourth phase, the air stream is passed through smoke filter 206 and out of exhaust vents 204a and 204b.

In additional embodiments of the principles of the present invention, apparatus may be provided within hood 201 or exhaust housing 203 for releasing an odor masking agent, freshening aroma, or disinfectant. A reactive device, such as an ultraviolet light source, may also be provided for killing bacteria, viruses, and other pathogens.

The illustrated embodiment of the present principles is contrasted with a conventional ductless ventilation hood 300 in FIG. 3A. As shown in FIG. 3A, the conventional system includes a restricted canopy 302 having a limited capability to capture cooking byproducts generated on the underlying cooking equipment (not shown). In particular, the aperture of canopy 302 is obstructed by a conventional filter system 303 formed by metal baffles and/or a thin layer of filter material. The metal baffles and/or thin layer of filter material are not only ineffective in stopping grease, smoke, and odors, from flowing through but also are difficult to remove and clean of those cooking byproducts that are captured.

Conventional ventilation system 300 utilizes a simply blower 301 for inducing air flow through the system housing. Blower 301 does not extract any of the grease that has passed through filter 303 and simply exhausts that grease back into the surrounding environment. Conventional ventilation system 300 does not include a thick charcoal filter for removing odors or a smoke filter for removing smoke pulled-in in from the stove.

In sum, the principles of the present invention are embodied in robust apparatus and methods for removing airborne cooking byproducts, including grease, odor, and smoke. These embodiments include a wide-open hood (canopy) and a centrifugal blower-grease extractor, which efficiently capture the cooking byproducts and remove grease. A thick odor filter ensures that the airstream exhausted from the blower-grease extractor is sufficiently exposed to the active filter material such that odors are substantially removed. A smoke filter, having a pleated-material filter element with a large surface area, ensures that smoke is substantially removed from the air stream.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A duct-free air filtration system comprising:
   a housing including hood sidewalls defining an open space therebetween for capturing air, grease, and smoke, and an elongated exhaust section in fluid communication with the open space between the hood sidewalls;

a grease extracting blower unit taking in air, grease, and smoke from an underlying cooking space through an unobstructed airflow path provided by the open space between the hood sidewalls and exhausting air and smoke through the exhaust section of the housing, wherein a substantial amount of the grease is removed by centrifugal force and captured in a container by the grease extracting blower, and wherein the grease extracting blower unit comprises:

a blower unit house having a first end disposed within the open space defined by the hood sidewalls, a second end opposing the first end, an upper surface, an offset exhaust aperture proximate the second end for exhausting air and smoke to the exhaust section of the housing, and an intake through the upper surface at a point between the first end and the offset exhaust aperture for taking in the air, grease, and smoke from the cooking space;

a squirrel cage fan disposed within the blower unit housing and having an axis of rotation substantially aligned with the intake through the upper surface of the blower unit housing; and a motor for rotating the squirrel cage fan, the motor disposed within the circumference of the squirrel cage fan and substantially aligned with the axis of rotation;

a charcoal odor disposed in the exhaust section for removing odors from the air exhausted from the grease extracting blower unit, wherein the charcoal odor filter comprises a bed of charcoal pellets disposed in an inverted U-shaped support structure of perforated metal disposed within a charcoal odor filter housing, a wider open end of the inverted U-shaped support structure accessible through an open bottom of the charcoal odor filter housing for receiving air exhausted from the offset exhaust aperture of the blower unit housing; and a smoke filter mounted directly on an open top of the charcoal odor filter housing for removing smoke from the air passed through the charcoal odor filter.

2. The duct-free air filtration system of claim 1, wherein the bed of charcoal pellets has a nominal thickness of one inch.

3. The duct-free air filtration system of claim 1, wherein the smoke fill comprises a filter element composed of pleated filtering material.

4. The duct-free air filtration system of claim 3, wherein the filtering material is composed of glass fibers.

5. A cooking ventilation system comprising:

a grease extracting blower for extracting grease from captured air containing cooking byproducts using centrifugal force and collecting the extracted grease in a container;

a hood having sidewalls defining an open space therebetween for capturing air including the cooking byproducts from an underlying cooking space, the open space between the hood sidewalls providing an unobstructed airflow path for the captured air to an intake of the blower;

an inverted U-shaped charcoal filter disposed within a charcoal filter housing for removing odor from a stream of air exhausted from the blower, wherein a wider open end of the inverted U-shaped charcoal filter is accessible through an open bottom of the charcoal odor filter housing;

a smoke filter disposed directly on an open top of the charcoal filter housing and comprising a pleated glass fiber filtering element for removing smoke from the stream of air exhausted from the charcoal filter;

wherein the grease extracting blower comprises:

a blower housing having a first end disposed within the open space defined by the sidewalls of the hood, a second end opposing the first end, an offset exhaust aperture proximate the second end for exhausting the stream of air to the wider open end of the inverted U-shaped charcoal filter, and an upper surface through which the intake is disposed at a point between the first end and the offset exhaust aperture;

a squirrel cage fan disposed within the blower housing and having an axis of rotation substantially aligned with the intake through the upper surface of the blower housing; and a motor for rotating the squirrel cage fan, the motor disposed within the circumference of the squirrel cage fan and substantially aligned with the axis of rotation.

6. The cooking ventilation system of 5, wherein the charcoal filter comprises a bed of charcoal pellets.

7. The cooking ventilation system of claim 6, wherein the bed of charcoal pellets has a nominal thickness of one inch.

8. The cooking ventilation system of 5, wherein the system comprises an exhaust housing in fluid communication with the hood and wherein the charcoal filter and the smoke filter are disposed within the exhaust housing.

9. The cooking ventilation system of claim 8, wherein the charcoal filter and the smoke filter are discrete units independently removable from the exhaust housing.

* * * * *

UNITED STATES PATENT AND TRADEMARK OFFICE
CERTIFICATE OF CORRECTION

| | | |
|---|---|---|
| PATENT NO. | : 9,222,680 B1 | Page 1 of 1 |
| APPLICATION NO. | : 12/804470 | |
| DATED | : December 29, 2015 | |
| INVENTOR(S) | : William Miles Woodall, II et al. | |

It is certified that error appears in the above-identified patent and that said Letters Patent is hereby corrected as shown below:

CLAIMS:

Column 5, Lines 44-46 should read

3. The duct-free air filtration system of claim 1, wherein the smoke filter comprises a filter element composed of pleated filter material Signed and Sealed this
Tenth Day of May, 2016

Michelle K. Lee
*Director of the United States Patent and Trademark Office*